United States Patent [19]

Kyriakis

[11] Patent Number: 4,693,615

[45] Date of Patent: Sep. 15, 1987

[54] NON-CONTACT TEMPERATURE MEASUREMENT OF A STATIC OR MOVING TARGET

[76] Inventor: John Kyriakis, 36 Minster Court Hillcrest Road, Ealing, London, England

[21] Appl. No.: 744,415

[22] Filed: Jun. 13, 1985

[30] Foreign Application Priority Data

Jun. 14, 1984 [GB] United Kingdom ............... 8415164

[51] Int. Cl.[4] .................... G01N 21/27; G01J 5/52
[52] U.S. Cl. ................................ 374/129; 250/351;
250/548; 250/339; 374/153
[58] Field of Search ............... 374/121, 124, 153, 127, 374/226, 129; 250/571, 559, 351, 339

[56] References Cited

U.S. PATENT DOCUMENTS

| | | | |
|---|---|---|---|
| 3,089,382 | 5/1963 | Hecht et al. ................... | 250/226 X |
| 3,435,240 | 3/1969 | Brunton ........................ | 250/571 X |
| 3,579,775 | 5/1971 | Carlson ........................ | 29/96 |
| 3,795,918 | 3/1974 | Sunderland .................... | 374/127 X |
| 3,821,551 | 6/1974 | Jones ........................... | 250/351 X |
| 3,863,071 | 1/1975 | Campanella ................... | 250/351 X |
| 4,023,599 | 5/1977 | Zeleny ......................... | 250/559 X |
| 4,087,690 | 5/1978 | Prober .......................... | 250/351 X |
| 4,337,396 | 6/1982 | Lauer et al. ................... | 250/351 X |
| 4,439,049 | 3/1984 | Hoogendoorn et al. ......... | 374/124 |
| 4,470,710 | 9/1984 | Crane et al. ................... | 374/127 |
| 4,561,786 | 12/1985 | Anderson ....................... | 374/127 X |

FOREIGN PATENT DOCUMENTS 1573340 7/1970 Fed. Rep. of Germany.

Primary Examiner—Daniel M. Yasich
Attorney, Agent, or Firm—Fleit, Jacobson, Cohn & Price

[57] ABSTRACT

A method and apparatus for determining the temperature of a hot body by a non-contact technique. It comprises a chopping disc 2 which may be disposed in the path of the radient heat energy from the object so providing a pulsed output of radient heat energy directed towards a pyroelectric element 7. Between the pyroelectric element 7 and the disc 2 is a further rotatable disc 4 having a pair of wavelength filters 6 and 6'. A microprocessor 14 operates to rotate the disc 4 to interpose each filter 6 and 6' in turn in the path of the pulsed output from the disc 2 at predetermined time intervals. The consequent output from the pyroelectric element 7 is, after amplification, rectification and smoothing in suitable circuits, fed to the microprocessor 14, which then calculates the ratio of the signal from the element 7 representative of power output through one of the filters, and the signal from element 7 representative of power output through the other filter. In this way the temperature of the hot body is determinable without prior knowledge of the emissivity characteristics of the hot body.

8 Claims, 3 Drawing Figures

NON-CONTACT TEMPERATURE MEASUREMENT OF A STATIC OR MOVING TARGET

FIELD OF THE INVENTION

The present invention relates to a method and apparatus for non-contact temperature measurement of a static or moving target which may include telemetric and long range temperature monitoring as well as in localised manufacturing processes.

BACKGROUND OF THE INVENTION

It becomes necessary in continuous production processes to be able to measure the temperature of the material being produced, for example wires, cables and filaments, and which due to the rapid movement involved, a contact type of measurement is not possible.

Where objects are at a temperature say in excess of 500° C., non-contact temperature measurement of such objects is possible using present techniques which depend upon measurement of emitted radiant energy and thereby, knowing the surface emissivity characteristics of the material concerned, the temperature of a particular moving object can be calculated.

This method works quite well when the temperatures involved are in excess of say 500° C., that is the figure specified above, but below this, for example in the temperature range 50° C., the method becomes unreliable because of low values of emitted radiant energy, uncertainty concerning the emissivity characteristics of the material of the particular hot body being monitored, and the effects of background radiation on the eventual results obtained.

SUMMARY OF THE INVENTION

It is one object of the invention to provide a method and apparatus for the non-contact temperature measurement of an object which is free of the problems of the prior art and in particular is capable of providing accurate temperature measurement at low temperatures, being of course not limited thereto, but extending its usefulness throughout a wide range of temperature values and up to, for example, 2000° C.

According to the invention there is provided apparatus for non-contact temperature measurement of an object comprising means for providing intermittent pulses of radiant heat energy emitted from the object, at least two wavelength filters arranged to be intermittently movable into said path at predetermined intervals, means responsive to the emitted pulses passing through each said filter in turn and to provide an output representative of the emitted power from the hot body at the wavelength of the filters, and means capable of forming a ratio and/or continuous ratios of a said output from said responsive means produced by passage of emitted radiant energy alternatively through said filters whereby to determine the temperature of said body.

With this arrangement it is not necessary to know and preset the surface emissivity characteristics of the object under test because of the ability of the apparatus to form a ratio of the measured heat output from the hot body after passage through preset wavelength filters as prescribed, so that such characteristics are cancelled out in the ratio calculation.

The advantage of this is that the apparatus as defined may be used to measure low temperature moving targets, below 500° C., as well as the temperature of moving targets at much higher temperature for example up to 2000° C.

Other features and advantages will become apparent from the following more detailed discussion of a preferred way of carrying out the invention.

BRIEF DESCRIPTION OF THE DRAWINGS

An embodiment of the invention will now be described by way of example with reference to the accompanying drawings wherein.

BEST MODES OF CARRYING OUT THE INVENTION

Figure 1:
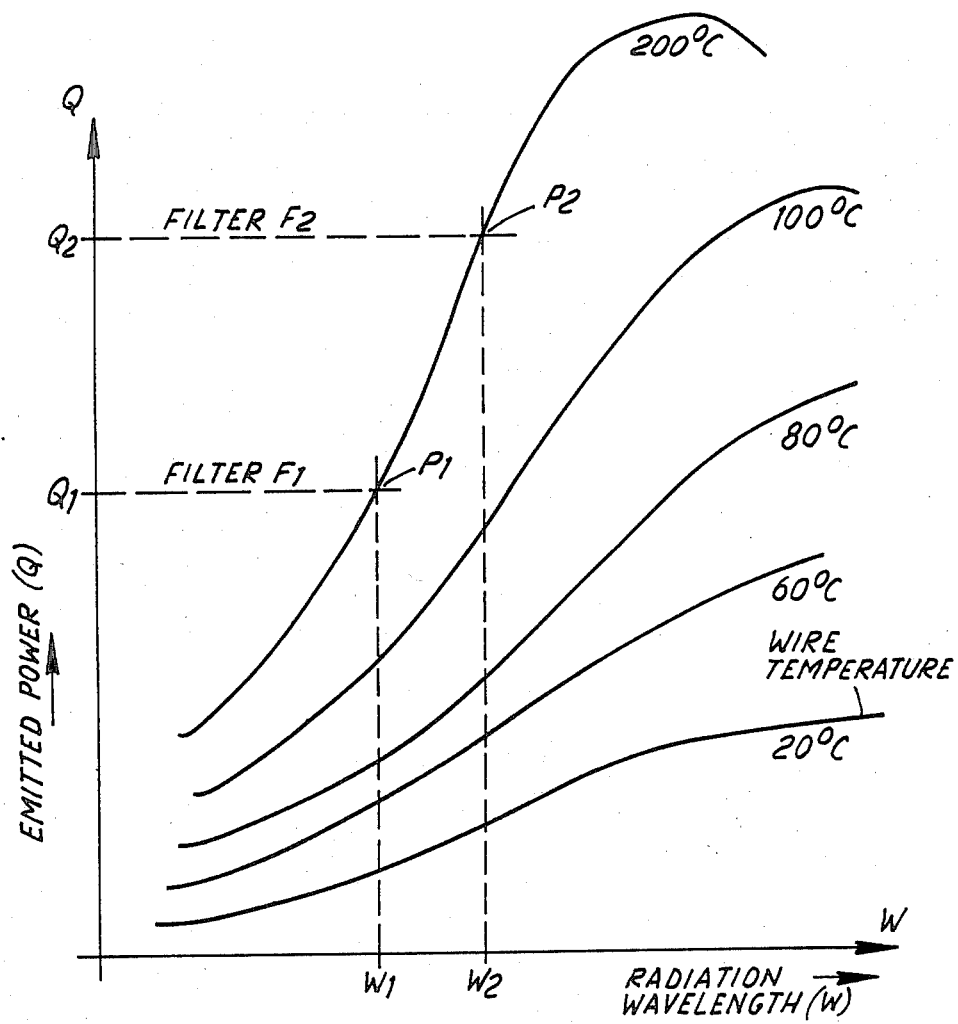
FIG. 1 is a graph of radiation wavelength against emitted radiant heat energy for a hot body at different temperatures.

To illustrate the principle behind the present invention, reference may be had to FIG. 1.

Now according to Planck's radiation formula the emitted power from a hot body may be given by the expression:

$$P = E_W 2\pi C_1 \int_0^\infty \frac{1}{(\lambda T)^5 (e^{C_2/\lambda T} - 1)} d\lambda$$

where
- $E_W$ = body emissivity (dependent on colour and surface)
- $C_1, C_2$ = traceable universal constants (Planck's spectral energy distribution)
- $\lambda$ = radiation wavelength
- $T$ = body temperature If the emitted power (P) is plotted against radiation wavelength ($\lambda$) for a hot body at various temperatures, the result is a series of curves, for each operating temperature, as shown in FIG. 1, as is well known in radiation theory.

Thus it can be seen that emitted power from a body at a particular temperature increases with the wavelength of the radiation emitted to a peak value before falling at higher wavelengths.

By passing the emitted heat energy from a hot body through two suitable filters corresponding to the wavelength of a particular quantity of emitted heat energy, it becomes possible to determine the temperature of the hot body without having knowledge of the emissivity characteristics of the hot body; this is extremely advantageous in the case of objects operating at lower temperatures, i.e., lower than 500° C.

To illustrate this consider two points $P_1$ and $P_2$ on the rising slope of the 200° C. curve shown in FIG. 1. These points $P_1$ and $P_2$ correspond to an emitted power of $Q_1$ and $Q_2$ at radiation wavelengths $W_1$ and $W_2$, respectively. If therefore the emitted heat energy from a hot body is passed through two filters $F_1$ and $F_2$ having wavelengths corresponding to wavelengths $W_1$ and $W_2$, then it follows that by taking the ratio of the correspondingly measurable radiant energy from the filters, using Planck's equation, the emissivity constants may be eliminated, and the temperature of the hot body determinable to some accuracy.

Figure 2:
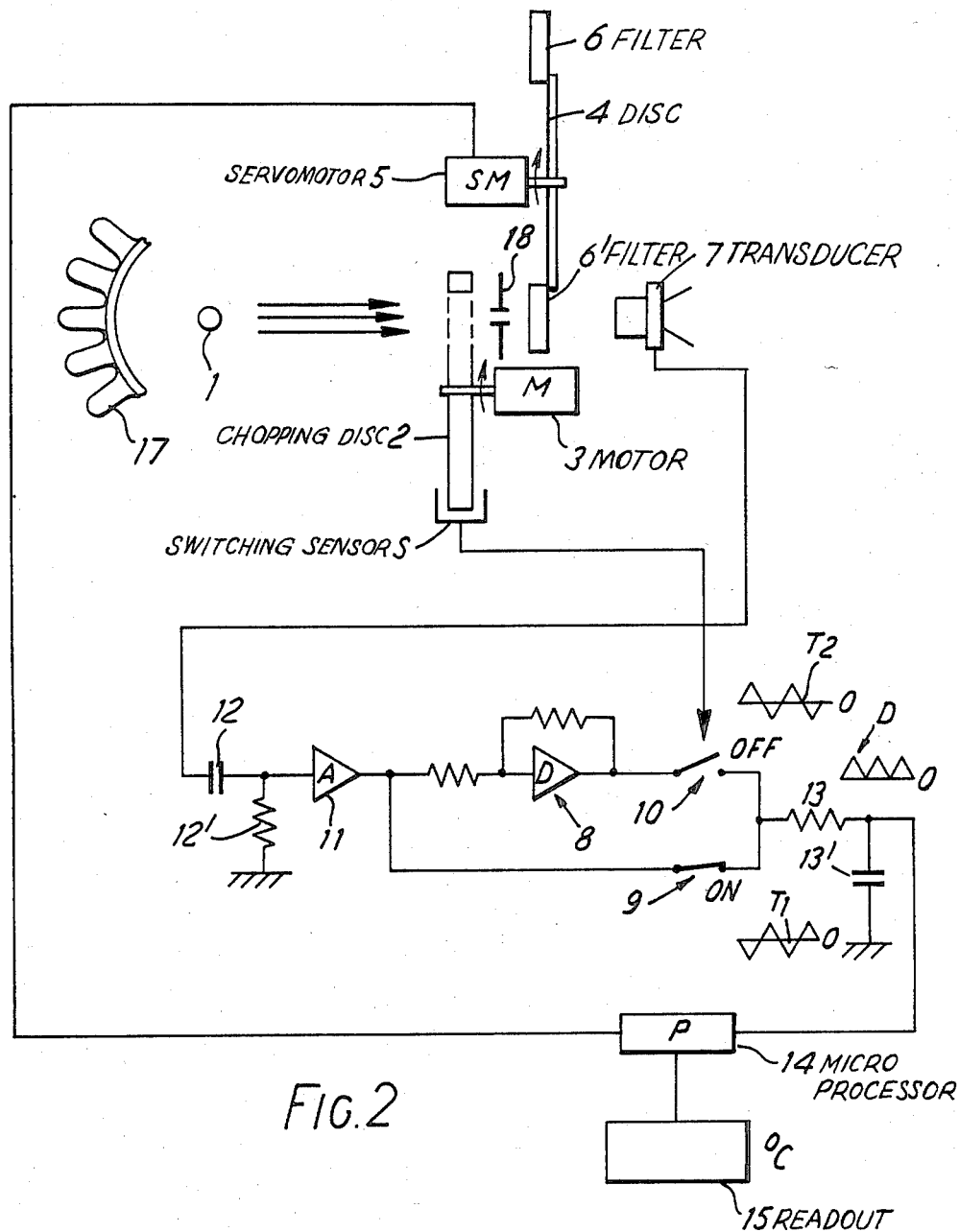
FIG. 2 is a schematic illustration of apparatus for non-contact temperature measurement of an object.
Figure 3:
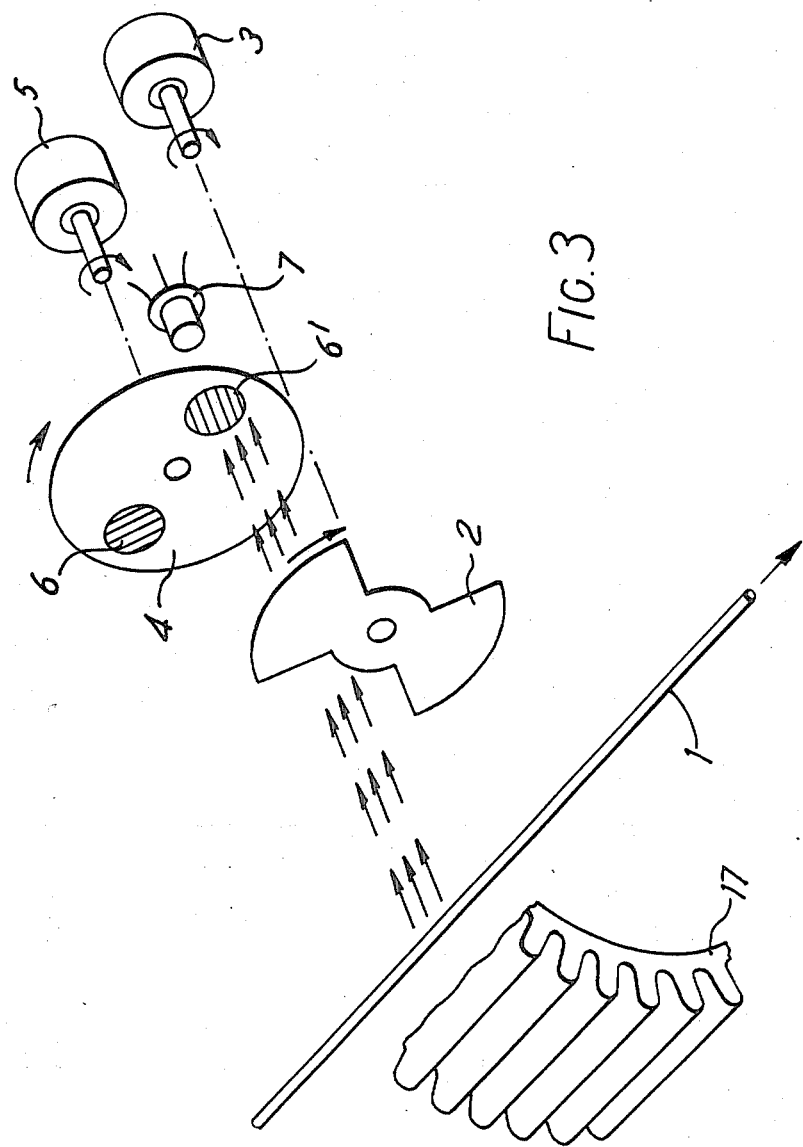
FIG. 3 is a further schematic illustration in perspective of giving a more detailed view of a portion of the apparatus shown in FIG. 2.

Suitable apparatus for carrying the invention into effect is shown in FIGS. 2 and 3.

In these figures, the emitted heat energy from a hot body 1, in this case a moving wire, is directed through a chopping disc 2 driven continuously by a motor 3 thereby producing a pulsed heat radiation output at a particular time frequency corresponding to the frequency of rotation of the disc 2.

A rotatable filter disc 4 driven by servo-motor (SM) 5, is arranged in the path of the pulses output of heat energy from the chopping disc 2. In the face of the disc 4, transverse to the path of the radiant heat, there is located a pair of diametrically spaced filters 6 and 6', and the disc 4 is rotated such that the pulsed output from the chopping disc 2 is successively passed through each of the filters 6 and 6'.

The radiant heat output from the filters 6 and 6' is directed onto a pyroelectric transducer 7, to provide an electrical output representative of the heat energy fed thereto through the rotating filters 6 and 6'.

With reference now more particularly to FIG. 2, the electronic and electrical circuitry suitable for operating the apparatus of the invention is seen to include a conventional demodulator circuit 8 including a pair of on-/off switches 9 and 10.

One side of the demodulator circuit 8 is connected through an amplifier 11 and filter circuit comprising capacitor 12 and resistor 12' to the pyroelectric transducer 7, and the other side through a filter circuit comprising resistor 13 and capacitor 13' to a microprocessor 14, the other side of the microprocessor 14 being connected to the servo-motor 5.

The on/off switches 9 and 10 are sequentially operated by the chopping disc 2 as it rotates typically at a 25 Hertz chopping rate, via switching sensor S, thereby to cause the demodulator circuit 8 to output two phase sensitive triangular wave forms $T_1$ and $T_2$ so that, as will be appreciated by those skilled in the appropriate art, the microprocessor 14 is able to receive via filter 13, 13' a smoothed, amplified DC signal D representative of the power output received by the pyroelectric transducer 7 respectively sampling the thermal power output from the filters 6 and 6'.

The rotatable position of the filters 6 and 6' in the path of the thermal output from the disc 2, is determined by the microprocessor 14 through servo-motor 5, whereby the microprocessor operates to rotate the disc 4, typically every 2 seconds, when it is required to calculate the ratio of the measured power outputs through the two filters 6 and 6', and display the temperature of the hot body on a digital read-out device 15 coupled thereto.

It will be appreciated that such monitoring can be carried out on a continuous basis thus enabling, for example the temperature of the wire 1 to be maintained constant over a predetermined period of time.

To prevent stray ambient temperatures from entering the measuring circuits the wire 1 is protected by shield 17. Moreover to remove the effects of radiation emanating from the chopping disc 2 and rotating disc 3, on the measured results, a slit 18 see FIG. 2, of suitable dimension, is interposed between the discs 2 and 3 so that the pyroelectric transducer is limited so far as practically possible, to seeing only the radiation from the hot wire 1.

I claim:

1. Apparatus for non-contact temperature measurement of elongated elements such as wires, cables and filaments in a continuous production process for making such elements, the apparatus comprising:

chopper means to be located adjacent at least one of said elongated elements as it passes a given point at which the temperature is to be measured;

first drive means for continuously driving the chopper means to produce trains of intermittent pulses of radiant heat energy being emitted by the elongated element as it continuously moves past the chopper means;

rotary means having first and second wavelength filters mounted thereon in space peripheral relation for being interposed successively into the path of the trains of intermittent pulses of radiant energy produced by the chopper means;

a pyroelectric transducer positioned to receive the filtered trains of intermittent pulses of radiant heat energy successively from the two filters and to provide first and second electrical outputs representative of the radiant heat energy received from the first and second wavelength filters, respectively;

microprocessor means for processing said electrical outputs to form a ratio thereof indicative of the temperature of the elongated element as it passes the given point;

second drive means periodically actuated responsive to a signal from said microprocessor means for driving said rotary means to interpose said filters successively into the path of the trains of intermittent pulses of radiant heat energy produced by the chopper means; and means to prevent extraneous radiation energy from impinging upon the pyroelectric transducer.

2. Apparatus according to claim 1 wherein the rotary means is a wheel with the two filters diametrically mounted thereon.

3. Apparatus according to claim 1 which the extraneous preventing means includes slit means interposed between the rotary means and the pyroelectric transducer in the path of the trains of intermittent pulses of radiant heat energy for preventing extraneous radiation from impinging upon the pyroelectric transducer.

4. Apparatus according to claim 1 further including shield means positioned adjacent the elongated element at the given point for preventing stray ambient radiation from entering a path of the trains of intermittent pulses of radiant energy.

5. A method for non-contact temperature measurement of a continuously moving elongated element such as a wire, cable and filament, the method comprising:

continuously chopping radiant heat energy emitted from the element as it passes a point to produce trains of intermittent pulses of radiant heat energy being emitted from the elongated element;

providing first and second wavelength filters in spaced transverse relation for interposing successively into a path of the trains of intermittent pulses of radiant energy;

providing a pyroelectric transducer for receiving the filtered trains of intermittent pulses of radiant heat energy successively from the two filters and for providing first and second electrical outputs representative of the radiant heat energy received from the first and second wavelength filters, respectively;

processing said electrical outputs with a microprocessor to form a ratio thereof indicative of the temperature of the elongated element as it passes said point;

periodically interposing the two filters into the path of the trains of intermittent pulses of radiant energy responsive to a signal generated during said processing of said outputs; and preventing substantially all extraneous radiant energy from impinging upon the pyroelectric transducer.

6. A method according to claim 5 including the step of restricting the path of the trains of intermittent pulses of radiant heat energy by interposing slit means between the filters and the transducer to prevent the extraneous radiation impinging upon the transducer.

7. A method according to claim 5 including shielding the elongated element at said point to prevent stray ambient radiation from entering the path of the trains of intermittent pulses of radiant heat energy.

8. A method according to claim 5 wherein the elongated element has a temperature in the range from 50–500° C.

* * * * *